United States Patent
Lavoine et al.

(10) Patent No.: US 8,137,090 B2
(45) Date of Patent: Mar. 20, 2012

(54) DEVICE FOR PRODUCING NUCLEAR FUEL PELLETS AND PRODUCTION METHOD APPLYING SUCH A DEVICE

(75) Inventors: Remy Lavoine, Lussan (FR); Pierre Guelfi, Les Angles (FR); Jean-Luc Pandraud, Cavillargues (FR)

(73) Assignee: Areva NC, Paris (FR)

( * ) Notice: Subject to any disclaimer, the term of this patent is extended or adjusted under 35 U.S.C. 154(b) by 107 days.

(21) Appl. No.: 12/083,719

(22) PCT Filed: Oct. 16, 2006

(86) PCT No.: PCT/EP2006/067430
§ 371 (c)(1),
(2), (4) Date: Apr. 16, 2008

(87) PCT Pub. No.: WO2007/045624
PCT Pub. Date: Apr. 26, 2007

(65) Prior Publication Data
US 2009/0243127 A1  Oct. 1, 2009

(30) Foreign Application Priority Data
Oct. 18, 2005  (FR) .................... 05 53156

(51) Int. Cl.
*B29C 43/58* (2006.01)

(52) U.S. Cl. .................... 425/169; 425/352; 425/436 R; 264/0.5

(58) Field of Classification Search .................... 425/352, 425/436 R, 169; 264/0.5; 198/803.14, 818
See application file for complete search history.

(56) References Cited

U.S. PATENT DOCUMENTS

| | | | |
|---|---|---|---|
| 4,354,811 A * | 10/1982 | Marmo .................... 425/140 |
| 4,649,632 A | 3/1987 | Schoenig, Jr. et al. |
| 4,657,729 A | 4/1987 | Bunch et al. |
| 4,687,605 A * | 8/1987 | Cellier et al. .................... 264/0.5 |
| 5,489,184 A | 2/1996 | Huggins |
| 2004/0178049 A1 * | 9/2004 | Hertz et al. .................... 198/690.2 |

FOREIGN PATENT DOCUMENTS

| | | |
|---|---|---|
| EP | 0196876 A2 | 3/1986 |
| EP | 0534065 A1 | 6/1992 |
| FR | 1543604 | 10/1967 |
| JP | 4269699 | 9/1992 |
| WO | 2007045651 | 4/2007 |

OTHER PUBLICATIONS

French Preliminary Search Report, FA 673680, FR 0553156, dated May 12, 2006.

* cited by examiner

*Primary Examiner* — Joseph Del Sole
*Assistant Examiner* — James Sanders
(74) *Attorney, Agent, or Firm* — Nixon Peabody LLP

(57) ABSTRACT

Production device including a press, a conveyor (4) intended to transport pellets from the press to a sintering area, means (26) for transferring pellets from the press to the conveyor (4), and means for inspecting at least one nuclear fuel pellet at the exit of a press, said inspection means including means (20) for identifying each pellet according to its die of origin.

16 Claims, 4 Drawing Sheets

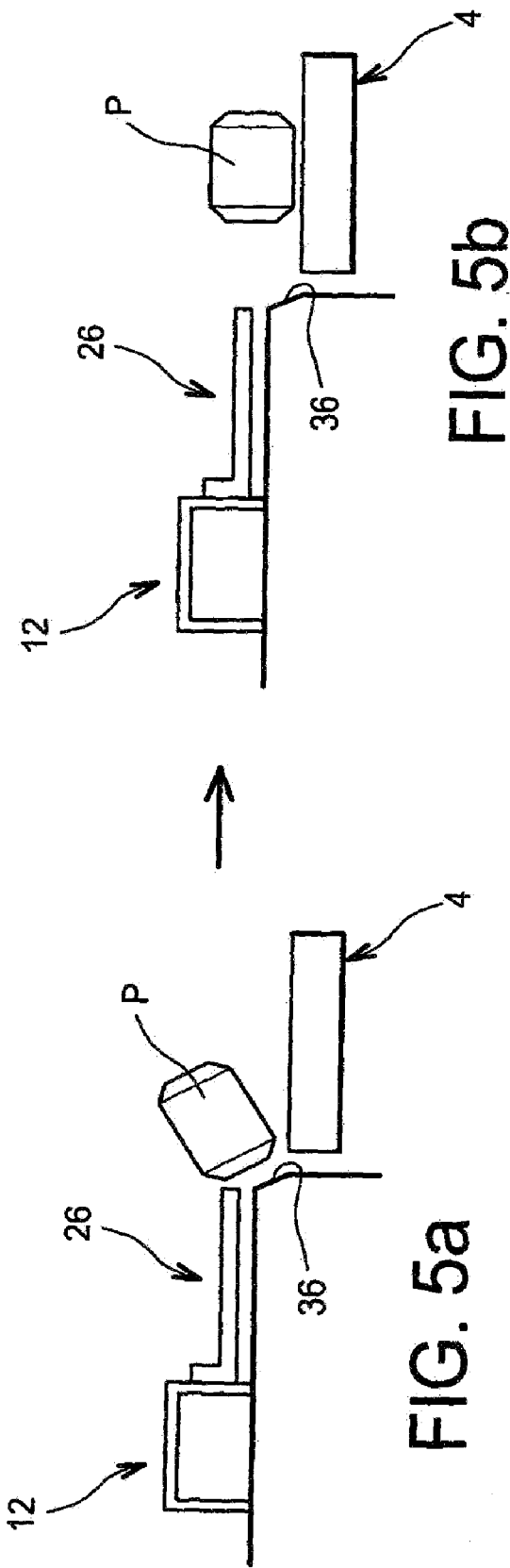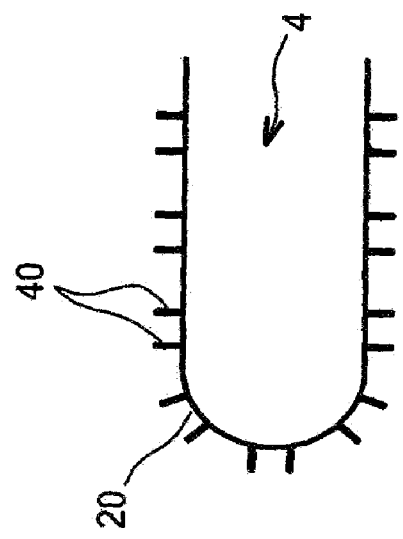

Figure 1:
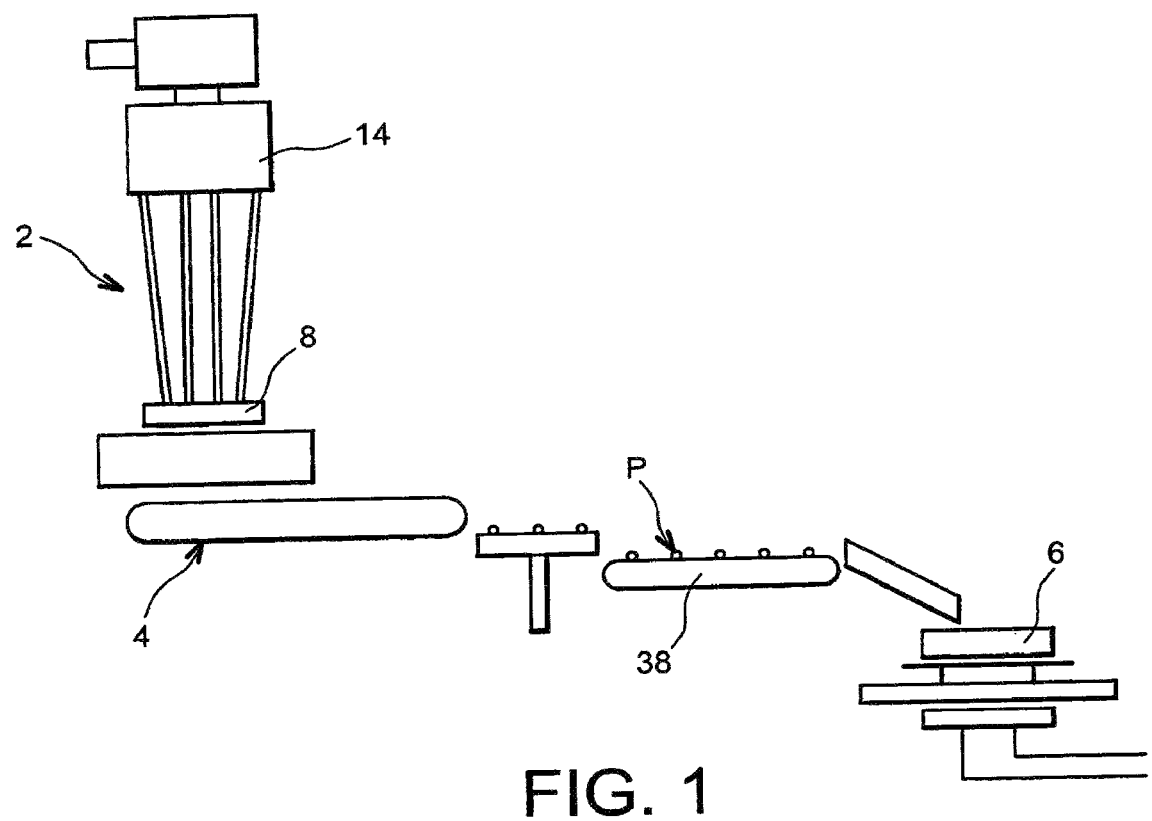

DEVICE FOR PRODUCING NUCLEAR FUEL PELLETS AND PRODUCTION METHOD APPLYING SUCH A DEVICE

CROSS REFERENCE TO RELATED APPLICATIONS OR PRIORITY CLAIM

This application is a national phase of International Application No. PCT/EP2006/067430 entitled "DEVICE FOR PRODUCING NUCLEAR FUEL PELLETS AND PRODUCTION METHOD APPLYING SUCH A DEVICE", which was filed on Oct. 16, 2006, and which claims priority of French Patent Application No. 05 53156, filed Oct. 18, 2005.

TECHNICAL FIELD AND PRIOR ART

The present invention relates to a device for producing nuclear fuel pellets, notably of MOX and to a manufacturing method applying such a device;

Nuclear fuel pellets notably of the MOX (mixture of plutonium oxide and uranium oxide) type are used in making assemblies of nuclear fuels intended to feed nuclear reactors.

The characteristics of the pellets, as well as their dimensions, their density and their composition, have to be accurately controlled in order to ensure secure optimum operation of the reactors.

These pellets are obtained by pressing powder in dies and by sintering these pressed pellets.

Several inspections of these characteristics are carried out all along the production of a pellet, for example at the exit of the press and then after sintering of the pellets, before their placing in a cladding.

Inspection at the exit of the press is particularly complicated. Indeed, the press includes several dies (or moulds), each of them allowing the pressing of one pellet. In order to carry out an efficient inspection, it is necessary to check proper operation of each die, notably in terms of filling and pressing.

From document EP 01 534 065, a device is known for detecting the presence of cracks in the pellets, this detection being directly carried out in the press, the press being rotary and allowing the production of several pellets at the same time. This inspection consists of measuring vibrations and of comparing them with representative vibrations of faulty pellets.

This device for example does not allow the density of the pellets to be inspected. Further, it carries out a systematic inspection of each pellet, which extends the time for producing the pellets.

Accordingly, an object of the present invention is to provide a production device allowing the density of the produced pellets to be inspected.

An object of the present invention is also to provide a production method allowing inspection of pellets without extending the production cycle.

DISCUSSION OF THE INVENTION

This object is achieved by a production device, with which each of the pellets may be located according to its die of origin and at least one may be picked up in order to analyze it. Thus, it is possible to detect whether a die is faulty and to intervene accordingly.

In other words, the device according to the present invention allows each pellet to be identified, thus it is simple to check proper operation of a determined die by inspecting a pellet originating from said die.

The subject-matter of the present invention is mainly a production device including a press provided with dies, a conveyor intended to transport the pellets of the press towards a sintering area, means for transferring the pellets from the press to the conveyor, and means for inspecting at least one nuclear fuel pellet at the exit of a press, characterized in that said inspection means include means for identifying each pellet according to its die of origin.

The identification means are advantageously borne by the conveyor, and formed by a succession of housings on the surface of the conveyor, each capable of receiving a pellet.

Further, these housings may be perpendicular to a displacement direction of the conveyor.

Advantageously, the distance separating two adjacent housings is equal to that separating two dies, the respective projections of which on a line parallel to the displacement direction of the conveyor are the closest.

The conveyor may also include means for aligning the housings with the dies.

In an exemplary embodiment, the conveyor is displaced by rollers, a complete turn of the roller corresponding to a displacement by a determined number of housings.

In a particular embodiment, the housings are adapted so as to receive pellets which are lying.

The conveyor may for example be an endless belt.

Advantageously, the housings are delimited by fins substantially perpendicular to the belts.

The device according to the present invention may include at least one means for picking up at least one pellet from a determined die to bring it to an analysis device.

This pick-up means may be formed by a piston capable of sliding parallel to the axis of the housings and pushing a determined pellet out of its housing, when the located housing is facing the piston.

The transfer means as for them advantageously include a comb capable of sliding on the dies perpendicularly to the displacement direction of the conveyor.

The comb may include fingers separated by spaces, the number of spaces being at least equal to the number of dies.

These spaces preferably are of a flared shape in the direction of the conveyor in order to receive the pellets.

Advantageously, the transfer means are capable of allowing rotation around an axis parallel to the displacement direction of the conveyor.

According to an exemplary embodiment, the press includes an end bordered by the conveyor including a downward bevel in the direction of the conveyor.

The device according to the present invention may also include a device for analyzing the picked-up pellets. It may also include means for introducing the picked-up pellets into the production device downstream from the pick-up means, when their characteristics are acceptable.

The subject-matter of the present invention is also a method for picking up pellets after their pressing in order to inspect them, including the steps of:

filling the dies with powder,
pressing the powder,
transferring the pellets onto the conveyor,
actuating the conveyor,
picking up a pellet from a determined die,
conveying the pellets towards a sintering area.

Advantageously, during the picking-up step, the picked-up pellet originates from a die different from the one of the picked-up pellet during a preceding picking-up step.

In an exemplary embodiment, during the step for activating the conveyor, it may be provided that the latter displaces a number of housings equal to the number of loaded pellets plus one.

In another exemplary embodiment, it may be provided that during the step for actuating the conveyor, the latter displaces a number of housings equal to the number of loaded pellets.

During the transfer step, the conveyor may for example stand still relatively to the press, so as to align each die with a housing.

Advantageously, during the transfer step, the pellets topple around an axis parallel to the displacement direction of the conveyor from an upright position to a lying position.

A step may also be provided, in which, if a picked-up pellet is considered as acceptable, it is reintroduced into the production line.

The device according to the present invention is perfectly integrated into the production line and does not slow down or only very little the production rate. Further, it allows fast detection of the defects.

The device according to the present invention advantageously makes provision for carrying out an inspection by sampling, so that the production line may not be perturbed excessively.

SHORT DESCRIPTION OF THE DRAWINGS

Figure 4:
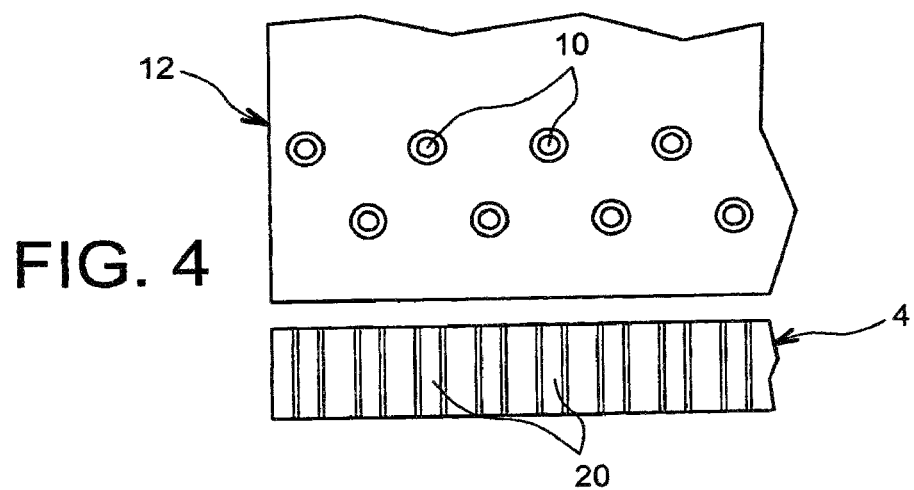
Figure 2:
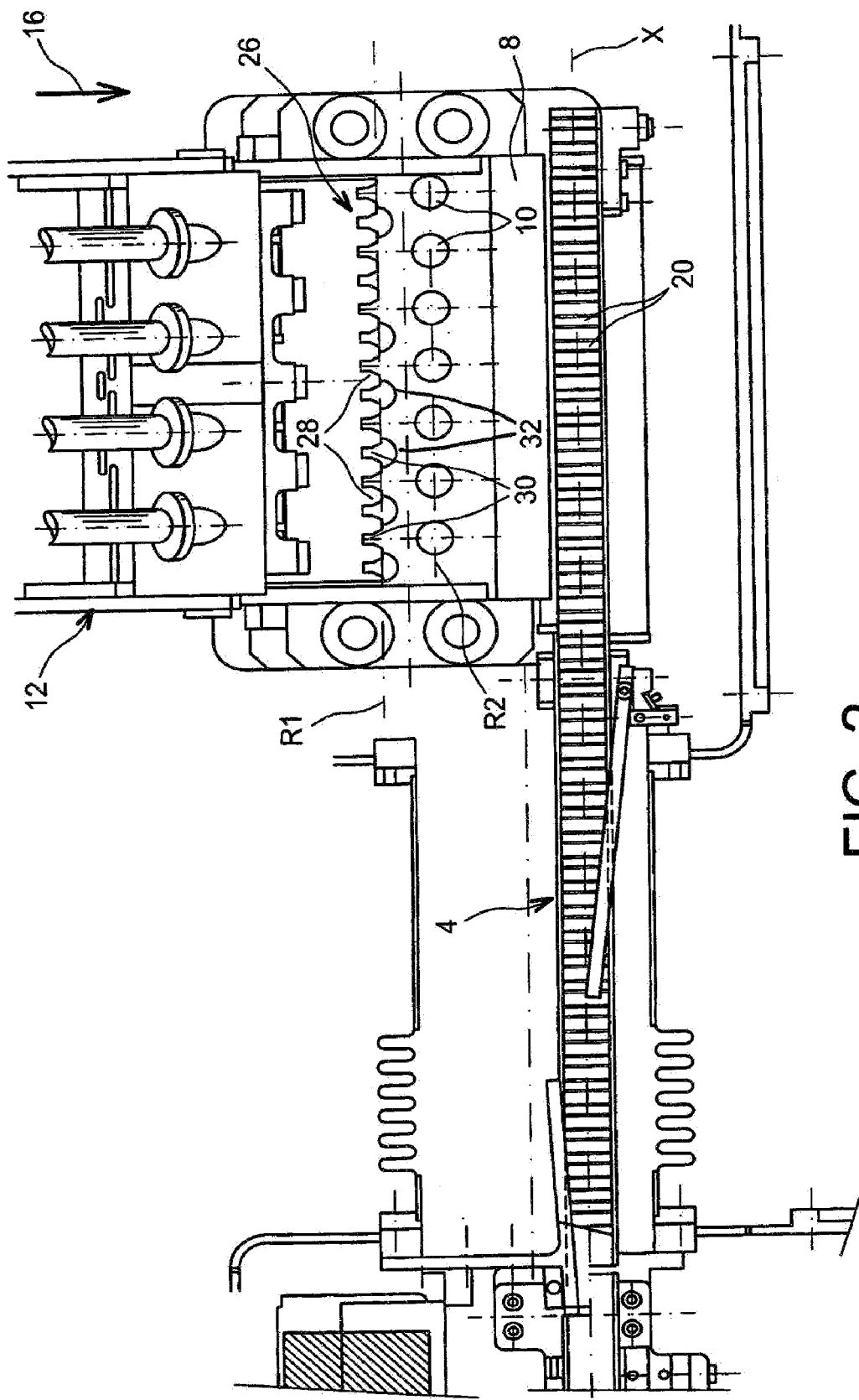
Figure 3:
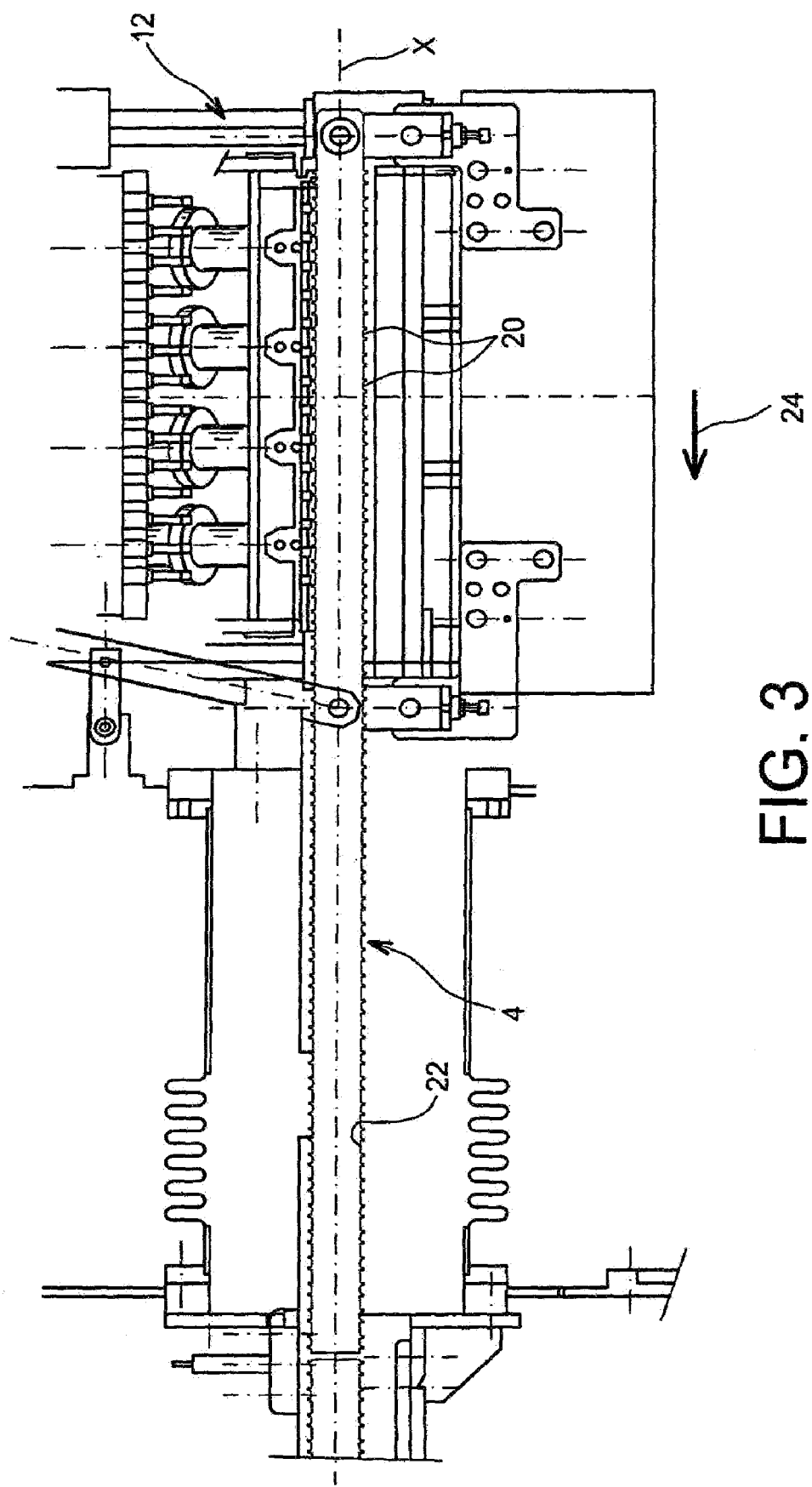

The present invention will be better understood with the help of the description which follows and of the appended drawings, wherein:

FIG. 1 is a schematic illustration of a production device according to the present invention, FIG. 2 is a side view of a detail of a conveyor according to the present invention, FIG. 3 is a top view of the conveyor of FIG. 2, FIG. 4 is a schematic illustration of a detail of the production device according to the present invention, as seen from above, FIGS. 5a and 5b are diagrams of two steps for transferring pellets according to the present invention, FIG. 6 is a schematic illustration of a belt according to a preferred embodiment.

DETAILED DISCUSSION OF PARTICULAR EMBODIMENTS

In FIG. 1, a diagram of a device according to the present invention may be seen, including a press 2 for pellets P, a conveyor 4 capable of transporting the pellets P from the press 2 to a boat 6, the boat 6 being intended to circulate in an oven (not shown) in order to carry out sintering of the pellets which it contains.

The press 2 includes a table 8 provided with dies 10 (FIG. 2) forming moulds, wherein powder is pressed by means of punches (not shown).

The produced pellets P substantially have the shape of a regular cylinder.

The filling of the dies 10 is carried out by means of a shoe 12, fed with powder by a hopper 14. The shoe 12 is intended to move above the dies in order to distribute the powder in the dies 10 in a substantially uniform way.

In FIG. 2, the distribution of the dies may be seen as two rows R1, R2, the dies being shifted transversely relatively to each other, so that upon looking along the arrow 16, a die of row R1 is found between two dies of row R2.

In the illustrated exemplary embodiment, each row R1, R2 includes seven dies positioned parallel to an axis X.

The production device according to the present invention allows inspection of the production quality of each die and in particular of the punches, for this, it includes means for checking the characteristics of the pellets such as density. Density is for example computed from the mass of the pellet, which is obtained by weighing and from the volume of the pellet; the diameter of the pellet is defined during parameterization of the press and the height of the pellet is measured at the exit of the press, the pellet may include bevelled edges at its ends, their dimensions are defined during parameterization.

According to the present invention, the conveyor 4 includes housings 20 capable of individually receiving a pellet from a determined die 10.

The conveyor is advantageously formed with an endless belt 22 bearing housings 20. The endless belt is wound around at least a drive roller and at least a guide roller separated by a sufficient distance for tensioning the belt. Each roller is rotatably mobile around an axis, the axes being parallel. The rotation of the drive roller causes displacement of the belt, which is guided towards a second end by the guide roller.

Provision may also be made for two synchronized drive rollers.

The distance separating two adjacent housings 20 is substantially equal to that separating two dies 10, the respective projections of which on a line parallel to the displacement direction of the conveyor are the closest (FIG. 4).

The housings are each capable of receiving a pellet which is lying.

The transverse dimension of the belt advantageously is at least as large as the longitudinal dimension of the pellets P, in order to improve their hold on the belt.

The housings 20 are, for example, added onto the belt 22 or advantageously in one piece with the belt, for example achieved by molding. The belt is for example made in radiation-resistant elastomer.

In FIG. 6, an exemplary embodiment of the housings 20 may be seen. The belt includes fins 40 substantially perpendicular to the belt and delimiting compartments forming housings 20. With this type of belt, the positioning of the pellet may be provided at right angles to the ejection device.

Advantageously, the ejection device is located on a tilted portion of the belt; this tilted portion allows the pellet to roll and to position itself against a fin of the conveyor. Thus, the pellet is always positioned in the same way for ejection towards the dimensional inspection device.

Housings with a transverse V or U section may also be provided.

The conveyor 4 moves in the direction indicated by the arrow 24, in order to convey the pellets P towards a loading area in view of a sintering operation.

In the illustrated example, the belt moves by fourteen housings or fifteen housings, leaving in the latter case, a vacant housing between each loading following a press stroke.

When the belt moves by fifteen housings, it leaves one housing free between each pass of the press, so that the position of the pressed pellet in the punch firstly positioned in the press may be visually located in the direction of displacement of the belt upon each press stroke. This is particularly adapted to continuous production of pellets.

When a dimensional inspection is required, the belt moves by one housing at a time, with at each time an unloading of the pellet towards the dimensional inspection device. This is repeated fourteen times in order to pick up the fourteen pellets corresponding to the fourteen punches of the press.

The production device also includes means for allowing the notches 20 to be aligned with the dies 10.

According to the invention, provision is advantageously made for having one revolution of a roller around its axis represents a displacement of fourteen or fifteen housings, according to the provided loading method. Thus, with a simple rotation sensor, it is possible to monitor the displacement of the belt. It is then sufficient to adjust the alignment of the notches and of the dies at the beginning of the production cycle.

It may also be provided that the displacement of the required number of housings corresponds, for example, to a half-turn, to a quarter turn or to more than one turn of the roller.

Advantageously, during the loading of the pellets on the conveyor, the latter is at a standstill.

The device according to the present invention also includes means for transferring the pellets from the press onto the conveyor 4, formed by a comb 26 capable of moving parallel to the surface of the table and including fingers 28 which extend perpendicularly to the axis X in the direction of the conveyor. The comb is positioned sufficiently high in order to avoid any interaction with the lower punch and sufficiently low in order to ensure that the pellets area are held perpendicularly to the plane of the table during the displacement of the latter.

If the press includes n dies, the comb advantageously includes n+1 fingers delimiting two by two a space 30 aligned with a die 10 along an axis orthogonal to the axis X. For example, the press includes fourteen dies and the comb includes fifteen fingers (FIG. 2).

Thus each die 10 is associated with a space 30.

During the transfer of the pellets onto the conveyor, the pellets protrude from the table at their die of origin, their axis being orthogonal to the plane of the table. The comb moves towards the conveyor 4, each pellet is then received in the associated space 30. The comb 26 moves the pellets until they topple onto the conveyor (FIG. 5a). Each pellet P is then lying in a housing 20 (FIG. 5b).

Advantageously, each finger includes an end 32 oriented towards the conveyor, beveled so as to delimit flared spaces 30, improving the hold of the pellets P during their displacement on the table.

Advantageously, the comb is attached on an end of the filling shoe 12.

As this is may be seen in FIGS. 5a and 5b, the conveyor borders an end of the table, which advantageously includes a downward bevel 36 towards the conveyor, so as to facilitate pivoting of the pellets. This lying position of the pellets on the conveyor facilitates grasping of the pellets.

After each loading of the belt, the belt moves so as to have again n free housings 20 facing the n dies.

The production device according to the present invention also includes means for grasping at least one pellet in order to allow it to be inspected. Such picking-up means may be formed by a piston capable of sliding along an axis orthogonal to the direction X and having smaller dimensions than those of a housing 20.

Control means allow the piston to be actuated when a determined housing passes in front of the piston.

The piston is for example actuated pneumatically, hydraulically, or electromechanically.

Advantageously, the conveyor stands still for a short instant for picking up the pellet.

Each housing during the loading, is aligned with a determined die, and then the following loadings are carried out in a determined way by organized displacement of the belt. Thus, at any instant, the origin of each pellet is known.

On the one hand, a non-redundant inspection may be carried out at each press stroke, i.e. it is possible to pick up a pellet originating from a die different from the one of the previously inspected pellet. Thus, it is easy to carry out a systematic inspection of all the dies in a cyclic way. On the other hand, by knowing the die of origin, it is possible to intervene on the relevant die in a targeted way, making repairs faster and easier.

The inspection may be carried out, i.e.:
 by sampling the pellet from punch no.1 during the first press stroke, the pellet from punch no.2 during the second press stroke, etc. . . .
 by sampling fourteen pellets from a same press stroke.

If, on the other hand, the inspections do not detect any intolerable divergence of the characteristics of the picked-up pellet relatively to determined ranges of values, the pellet is introduced into the production device.

If the inspections on the other hand reveal a divergence of at least one characteristic of the pellet, relatively to the set criteria, the pellet is set aside. The production device may then be halted for intervention on the press.

Advantageously, provision is made for picking only one pellet among the fourteen produced pellets. Further, at each press stroke, a pellet originating from a die different from the one of the previously picked-up pellet is inspected. This inspection by sampling provides very relevant information on the quality of the produced pellets.

The conveyor 4 advantageously conveys the pellets right up to another transport device 38, for example a belt conveyor which will convey the pellets right up to a boat loading device.

The boats are then displaced by means of skid inside an oven for sintering the pellets.

The production method according to the present invention includes the following steps:
 filling the dies,
 pressing the powder,
 transferring the pellets onto the conveyor according to the present invention,
 picking up at least one pellet for inspecting its characteristics and inspecting it,
 conveying the pellets to a sintering area.

We shall now detail the steps of the method according to the present invention.

During the filling step, the shoe 12 performs to-and-fro movements on the surfaces of the table, allowing the powder to be homogeneously distributed in the dies.

When the filling is finished, the shoe is moved away from the dies so that a lower punch and an upper punch may act in order to press the powder in each die.

When the pressing is finished, the table is advantageously lowered, the lower punches remain still causing the pellets to emerge out of the dies, the axis of the pellets is then perpendicular to the plane of the table.

The comb borne by the shoe then moves towards the conveyor 4, pushing the pellets towards the conveyor. When the pellets arrive at the end of the table bordered by the conveyor, the latter topple around an axis parallel to the displacement direction of the conveyor, from an upright position to a lying position.

During this transfer step and before the toppling of the pellets, the conveyor is advantageously brought to a standstill, so that the housings 20 are aligned with the dies 10.

Then, the conveyor may move a number of housings equal to the number of pellets to be loaded or a number of housings equal to the number of pellets to be loaded plus one, depending on the selected adjustments.

During the picking-up step, provision is advantageously made for picking only one pellet, the picked-up pellet originating from a die different from the one of the picked-up pellet during the previous picking-up step.

During the conveying step, the conveyor transports the remaining pellets towards an area for loading boats for the sintering of said pellets. Provision may also be made for reintroducing the picked-up and inspected pellet when it has been seen that it is acceptable.

The invention claimed is:

1. A device for producing nuclear fuel pellets comprising:
a press provided with dies,
a conveyor intended to transport pellets from the press to a sintering area,
means for transferring pellets from the press to the conveyor,
means for inspecting at least one nuclear fuel pellet at the exit of a press, said inspection means including means for identifying each pellet according to its die of origin, said identification means being formed by a succession of housings borne by the surface of the conveyor, and each capable of receiving a pellet, each of the housings being associated with a determined die,
means for allowing the housing of the surface of the conveyor to be aligned with the dies,
means for stopping the conveyor for loading the pellets in the housings of the conveyor;
an analyzer to analyze the picked-up pellets; and
at least one means for picking up the at least one pellet on a determined die to bring it to the analysis device, and wherein the means for picking up the at least one pellet is configured to pick up a pellet originating from a die different from the one of the a previously picked-up pellet and loading of the pellets is carried out by organized displacement of the conveyor such that at any instant the origin of each pellet is known and used by the inspection means to provide intelligent selection of pellets for inspection.

2. The device according to claim 1, wherein the housings are perpendicular to a displacement direction of the conveyor.

3. The device according to claim 1, wherein the distance separating two adjacent housings is equal to the distance separating two dies, the dies considered are those which the respective projections on a line parallel to the displacement direction of the conveyor are the closest.

4. The device according to claim 3, wherein the conveyor includes means for aligning the housings with the dies.

5. The device according to claim 1, wherein the conveyor is displaced by rollers and wherein a complete roller turn corresponds to a displacement by a determined number of housings.

6. The device according to claim 1, wherein the housings are adapted so as to receive the pellets which are lying.

7. The device according to claim 6, wherein the housings are delimited by fins substantially perpendicular to the conveyor.

8. The device according to claim 1, wherein the conveyor is an endless belt.

9. The device according to claim 1, wherein the picking-up means is a piston capable of sliding parallel to the axis of the housings and pushing a determined pellet out of its housing, when the located housing is facing the piston.

10. The device according to claim 1, wherein the transfer means includes a comb capable of sliding on the dies perpendicularly to the displacement direction of the conveyor.

11. The device according to claim 10, wherein the comb includes fingers separated by spaces, the number of spaces being at least equal to the number of dies.

12. The device according to claim 11, wherein the spaces are of a flared shape towards the conveyor in order to receive the pellets.

13. The device according to claim 1, wherein the housings are perpendicular to a displacement direction of the conveyor and the transfer means are capable of causing the pellets to topple onto the conveyor.

14. The device according to claim 1, wherein the press includes an end bordered by the conveyor, including a downward bevel towards the conveyor.

15. The device according to claim 1, including means for introducing the picked-up pellets into the production device downstream from the picking-up means, when their characteristics are acceptable.

16. A device for producing nuclear fuel pellets comprising:
a press provided with dies;
a conveyor configured to transport pellets from the press to a sintering area;
means for transferring pellets from the press to the conveyor, and wherein loading of the pellets onto the conveyor is carried out by organized displacement of the conveyor such that at
any instant the origin of each pellet is known and used by inspection means to provide intelligent selection of pellets for inspection; the means for inspecting at least one pellet at the exit of the press, said inspection means including means for identifying each pellet according to its die of origin and being formed by a succession of housings borne by the surface of the conveyor, and each housing capable of receiving a pellet, each of the housings being associated with a determined die.

* * * * *